United States Patent

[11] 3,575,562

| [72] | Inventor | Jack A. Remke<br>Dayton, Ohio |
|---|---|---|
| [21] | Appl. No. | 860,559 |
| [22] | Filed | Sept. 24, 1969 |
| [45] | Patented | Apr. 20, 1971 |
| [73] | Assignee | General Motors Corporation<br>Detroit, Mich. |

[54] CENTRIFUGAL SWITCH ASSEMBLY FOR A MOTOR STARTING CIRCUIT
3 Claims, 4 Drawing Figs.

[52] U.S. Cl. .................................................. 200/80, 73/546
[51] Int. Cl. .............................................. H01h 35/10
[50] Field of Search ................................ 200/80, 61.46; 73/546

[56] References Cited
UNITED STATES PATENTS
2,616,682  11/1952  Greenhut ..................... 200/80(X)
2,768,260  10/1956  Greenhut ..................... 200/80
2,903,535  9/1959   Sparklin ....................... 200/80
3,058,355  10/1962  Larsh ............................ 73/546(X)

Primary Examiner—Robert K. Schaeffer
Assistant Examiner—William J. Smith
Attorneys—E. W. Christen, C. R. Meland and Robert W. Smith ABSTRACT: In a preferred form, a centrifugal switch assembly for a motor having a motor starting circuit includes centrifugally actuated spring fingers mounted on the motor shaft and extending radially outwardly between fan blades provided on one end of the motor rotor. The ends of the spring fingers engage an actuator plate which is slidably mounted on an end portion of the motor housing. The spring fingers move the actuator plate so as to engage and disengage switch contacts which are connected in the motor starting circuit.

PATENTED APR 20 1971
3,575,562
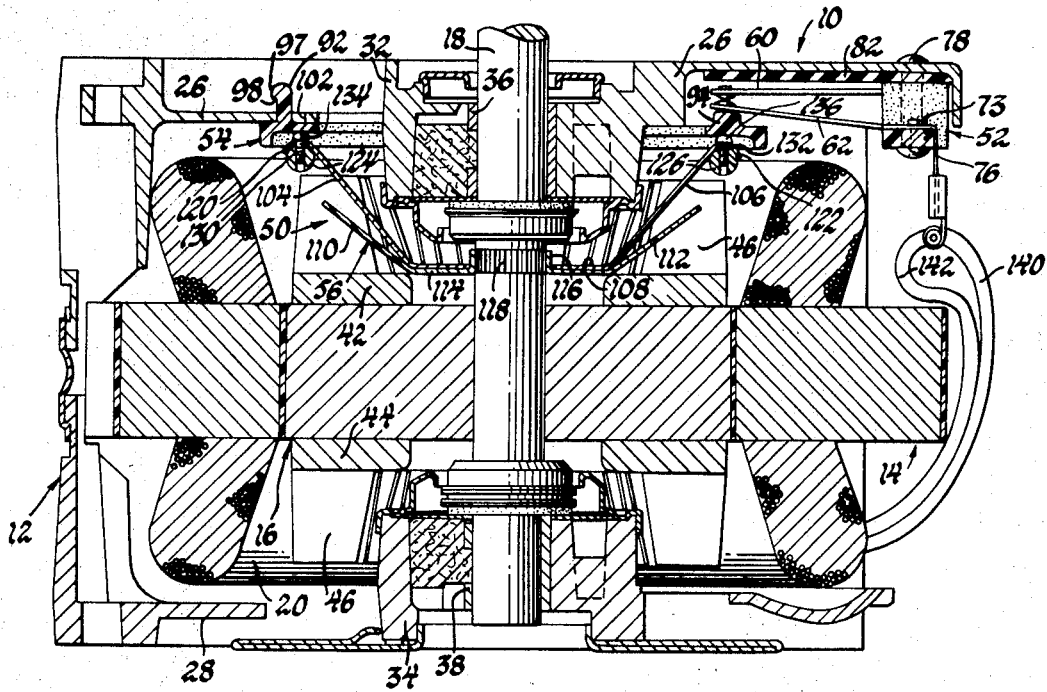
Fig. 1
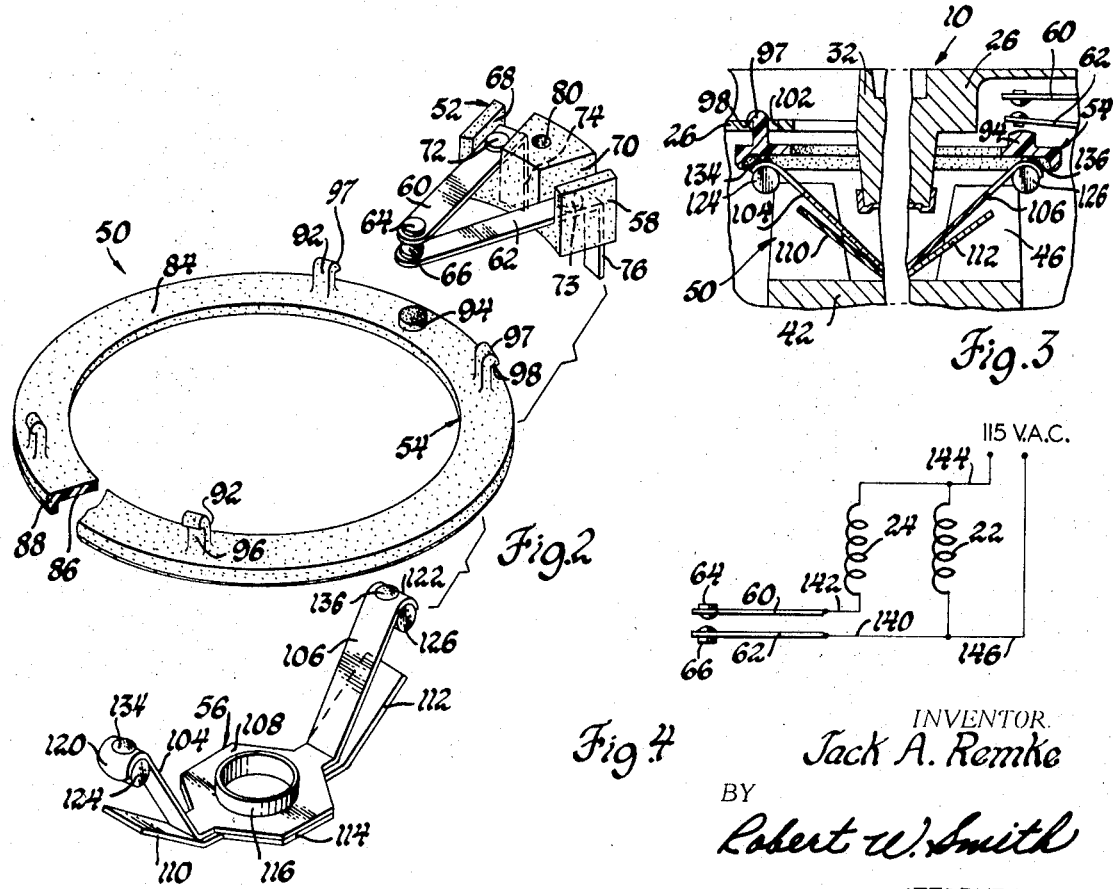
INVENTOR.
Jack A. Remke
BY
Robert W. Smith
ATTORNEY

CENTRIFUGAL SWITCH ASSEMBLY FOR A MOTOR STARTING CIRCUIT

This invention relates to centrifugally actuated switches and more particularly to an improved centrifugal switch assembly for electric motors including a starting circuit.

Centrifugally actuated switches are commonly employed in single phase AC induction motors which are used in industrial and household devices including appliances such as clothes dryers and washers, dish washers, garbage disposals and the like. These motors typically include a main winding and a starting winding which are energized when the motor is turned on. A centrifugal switch mechanism disconnects the starting winding when the motor has reached a predetermined speed and it is no longer desirable to maintain the starting winding energized.

Among the principal features of centrifugal switch assemblies are the mounting arrangements and space required for mounting the assemblies within the motor housing without changing the size or shape of the motors. It is also especially desirable that a centrifugal switch assembly is reliable, is easily serviced, and is made of a minimum of simple and inexpensive components so that the switch mechanism is easily manufactured and assembled to the motor.

In accordance with the present invention, a centrifugally actuated motor switch assembly includes three main components that are respectively provided by a contact assembly and an actuator plate which are both mounted on an end frame portion of the motor housing and a centrifugally operated member which is secured to the motor shaft. The contact assembly includes a pair of leaf spring arms carrying electrical contacts which are moved into engagement and disengagement by the actuator plate. The actuator plate includes an annular ring which is slidably mounted by a plurality of lugs extending through openings provided in the motor end frame. The centrifugally operated member includes spring fingers which are fixed to the motor shaft and are rotated thereby. The spring fingers extend radially outward between fan blades formed on one end of the motor rotor. Centrifugal weights are carried by the ends of the spring fingers and the ends move the actuator plate as the spring fingers are deflected by centrifugal forces which are developed as the shaft is rotated.

Accordingly, it is an object of this invention to provide an improved centrifugal switch assembly for an electric motor that is compactly mounted internally of the motor so as to require a minimum of housing space.

Another object of this invention is to provide a centrifugal switch for an electric motor wherein spring fingers extend radially between axially extending fan blades formed on the rotor and cooperatively operate an axially shiftable actuator plate for opening and closing a switch contact assembly.

A further object of this invention is to provide a centrifugally actuated switch assembly for a single phase AC induction motor including a starting winding and a rotor having fan blades at the end thereof, wherein centrifugally actuated spring fingers disposed between the fan blades shift an annular actuator plate supported on an end frame of the motor so as to reciprocably engage and disengage a pair of contacts also mounted on the end frame and connected with the starting winding.

Further objects and advantages of the present invention will be apparent from the following description, reference being had to the accompanying drawing wherein a preferred embodiment of the present invention is clearly shown.

FIG. 1 is a side sectional view of an electric motor with a centrifugal switch assembly embodying the present invention.

FIG. 2 is a perspective view of the principal parts of the present invention that have been removed from the motor illustrated in FIG. 1.

FIG. 3 is a fragmentary view of FIG. 1 illustrating the centrifugal switch assembly of this invention in one operating position.

FIG. 4 illustrates an electrical schematic diagram utilizing the present invention.

Referring now to the drawings and more particularly to FIG. 1, an electric motor 10 of a single phase AC induction motor type includes a motor housing 12, a stator 14, and a rotor 16 carried by a rotatable shaft 18. The stator 14 is supported by the housing 12 and includes a stator winding 20 comprising a main winding 22 and a starting winding 24, respectively, which are illustrated in the schematic circuit diagram of FIG. 4. The housing 12 is substantially cylindrical and includes end frames 26 and 28 provided at the opposite ends thereof. Cup-shaped bearing supports 32 and 34 carrying bearing assemblies 36 and 38, respectively, are formed in the centers of the end frames. The shaft 18 includes a forward portion rotatably supported by the bearing assembly 36 and a rearward portion rotatably supported by the bearing assembly 38. The shaft is vertically mounted in one preferred embodiment although the shaft can be disposed horizontally without departing from the principal features of the present invention as described hereinbelow.

The rotor 16 includes a plurality of squirrel cage bars, not shown, extending through the rotor. A pair of end rings 42 and 44 are disposed on opposite ends of the rotor, respectively. The end rings 42 and 44 are made of a cast aluminum material and electrically interconnect the respective ends of the squirrel cage bars in a well-known manner. Each end ring includes fan blades 46 having flat side surfaces cast integrally therewith for circulating air through the housing 12 as the shaft 18 rotates. The fan blades 46 extend axially from the rotor ends and are circumferentially spaced so that open spaces between the fan blades 46 are formed radially of the shaft 18.

A centrifugal switch assembly 50, provided by this invention, is mounted within the housing 12 and is described hereinafter with reference to the several FIGS. of the drawing. The centrifugal switch assembly 50 includes a contact assembly 52, an actuator plate 54, and a centrifugally operated member 56. The contact assembly 52 is connected in a motor starting circuit of the electric motor 10, as described hereinbelow, and is moved to opened and closed circuit positions by the actuator plate 54. The actuator plate 54 is responsive to the centrifugally operated member 56 which is mounted on the forward or upper end of the shaft 18 and is operated in accordance with shaft speed.

The contact assembly 52 is located on a radially outward portion of the end frame 26. The contact assembly 52 includes an arcuately shaped support block 58 and first and second leaf spring arms 60 and 62. The leaf spring arms 60 and 62 include fixed ends mounted on the support block and free ends carrying overlapping first and second contacts 64 and 66, respectively. The support block 58 is made of a suitable insulation material and includes two arcuately spaced notches 68 and 70. Each notch includes aligned bottom and side recessed surfaces which are substantially flat with the bottom surface of notch 70 recessed deeper into the block 58 than is the bottom surface of notch 68.

The leaf spring arms 60 and 62 are made of a resilient and electrically conductive material, such as a copper-beryllium alloy having a thickness of approximately 0.010 inch. The fixed ends of the leaf spring arms are mounted in a suitable manner, as by rivets 72 and 73, to the bottom surfaces of the notches 68 and 70, respectively. Depending tabs 74 and 76 are formed at the fixed ends of the leaf spring arms 60 and 62, respectively. The tabs 74 and 76 extend at right angles to the leaf spring arms 60 and 62 and extend along the side recessed surfaces of the notches 68 and 70 toward the interior of the housing 12. Electrical terminals are provided by the tabs 74 and 76 for making electrical connections to the leaf spring arms 60 and 62.

With the leaf spring arms 60 and 62 disposed in the notches 68 and 70, respectively, the free ends thereof overlap so that the contacts 64 and 66 are axially aligned. The contacts 64 and 66 are made of a silver contact alloy composition and include rounded contact engaging surfaces which are closed when the leaf spring arms are urged together.

The contact assembly 52 is mounted in the housing interior on an inner surface of the end frame 26 by a suitable means, as by a rivet 78 which extends through the end frame 26 and a hole 80 provided in the support block 58 intermediate the notches 68 and 70. An insulator 82, made of a suitable sheet insulation material, is clamped between the inner surface of the end frame 26 and the support block 58 by the rivet 78. The insulator 82 extends radially toward the shaft 18 over the leaf spring arms 60 and 62. Accordingly, the frame 26 is electrically insulated from the leaf spring arms 60 and 62.

The actuator plate 54 is formed by an annular ring of a suitable molded plastic insulation material. The plate 54 includes annular, substantially flat upper and lower surfaces 84 and 86. A downwardly extending ridge 88 is formed around the outer circumference of the lower surface 86. Four identical and circumferentially spaced lugs 92 and a small cylindrical projection 94 extend axially and upwardly from the upper surface 84. Axial guide surfaces 96 are provided on radially outer sides of the lugs 92 and the ends of the lugs include radially outwardly extending projections 97 which form shoulders 98. The shoulders 98 extend radially from the guide surfaces 96 and face the upper surface 84.

The actuator plate 54 is slidably mounted to the end frame 26 and encircles the forward end of the shaft 18 and the bearing support cup 32 of the end frame 26. Four hole openings 102, one being shown in the upper left-hand corner of FIG. 1, extend through the end frame 26. The holes 102 are circumferentially spaced complimentary to the spacing of the lugs 92 and receive the lugs 92. The plate 54 is assembled to the internal side of the end frame 26 by aligning the lugs 92 with the corresponding end frame holes 102 so that the projection 94 is aligned with the contacts 64 and 66 of the contact assembly. The lugs 92 are sufficiently resilient so that they are bent radially inward as the actuator plate is pressed toward the end frame 26. The lugs 92 pass through the holes 102 and spring back to their normal positions when the lug ends including shoulders 98 are external to the end frame 26. The guide surfaces 96 freely and slidably engage the sides of the holes 102.

The guide surfaces 96 have a length in the preferred embodiment shown of approximately five-sixteenth inch and the size of the holes 102 are approximately one-eighth inch thick so that the plate 54 is reciprocally movable approximately three-sixteenth inch between the upper position illustrated in FIG. 1 and the lower position illustrated in FIG. 3. In the lower position of FIG. 3 the shoulders 98 engage the outer side of the end frame 26 to provide stops that limit the downward or axially inward movement of the actuator plate. In the upper position illustrated in FIG. 1 the upper surface 84 of the actuator plate 54 limits the upward or axially outer movement of the actuator plate by engaging the inner side of the end frame 26. The guide surfaces 96 slide freely along the sides of holes 102 which prevent radial movement so that the actuator plate only moves axially relative to the shaft 18.

The centrifugally operated member 56 includes spring fingers 104 and 106 extending radially and angularly to the shaft 18 and being radially disposed on diametrically opposite sides of an integral flat base portion 108. Stop members 110 and 112 extend at an angle below in spaced relationship from the spring fingers 104 and 106, respectively, and are integral with a flat mounting portion 114 having an upstanding circular flange 116. The base portion 108 includes an annular opening through which the circular flange 116 extends with the base portion 108 mounted on the mounting portion 114. The spring fingers 104, 106 and base portion 108 are formed of a single piece of resilient sheet metal material having a thickness of approximately 0.010 inch. The stop members 110 and 112 and mounting portion 114 are formed of a single piece of sheet metal material having a thickness of approximately 0.30 inch so as to be substantially nonresilient relative to the resiliency of the spring fingers 104 and 106. The spring fingers and stop members, being flat, have a width which is slightly less than the narrowest length between adjacent sides of the fan blades 46.

The internal bore of circular flange 116 of the mounting portion 114 is fixedly secured to a knurled surface 118 formed on the shaft 18 at a location radially aligned with the end ring 42. The spring fingers 104 and 106, respectively, and the stop members 110 and 112, respectively, are disposed between diametrically opposite spaces between the sides of the fan blades 46. Accordingly, the spring fingers 104 and 106, respectively, extend radially outward and upward from the bottom of the fan blades 46 and terminate at outer free ends 120 and 122 which are best illustrated in FIG. 2.

The outer free ends 120 and 122 are bent arcuately back and downward. Centrifugal weights 124 and 126 are mounted on the underside of the outer free ends 120 and 122 by drive screws 130 and 132, respectively. The drive screws 130 and 132 include round head portions forming supporting surfaces 134 and 136 on the upper side of the outer free ends 120 and 122, as described further hereinbelow. The centrifugal weights 124 and 126 are made of a cylindrical rod material having a transverse hole in the center thereof for receiving the drive screws 130 and 132, as shown in FIG. 1. The supporting surfaces 134 and 136 of the outer free ends 120 and 122, formed by the round head screw portions, supportingly engage the bottom surface 86 of the actuator plate 54.

The centrifugal switch assembly 50 is connected to the starting circuit of the motor 10 by wire conductors 140 and 142. The wire conductor 140 is connected to the tab 76 of the leaf spring arm 62 and the wire conductor 142 is connected to the tab 74 of the leaf spring arm 60 as indicated in the schematic circuit diagram illustrated in FIG. 5. Accordingly, the contacts 64 and 66 are serially connected with the starting winding 24. The starting winding 24 and the contacts 64 and 66 are connected across input conductors 144 and 146 which are adapted to be connected in a suitable manner to a conventional electrical power source of 115 volts AC for example. The main winding 22 is also connected across the input conductors 144 and 146 so as to be energized during both starting and running cycles of motor operation.

In operation, prior to the motor being initially energized through the input conductors 144 and 146, the centrifugal switch assembly 50 is in the operative position illustrated in FIG. 1. The actuator plate 54 rests on supporting surfaces of the spring fingers provided by the heads of the drive screws 130 and 132 so that it is supported in an upper position by the spring fingers 104 and 106. With the actuator plate 54 in the upper position, the radially extending projections 97 and the shoulders 98 of the lugs 92 are spaced above the end frame 26. The projection 94 engages the bottom of the contact 66 so that the leaf spring arm 62 is resiliently bent upward and the contacts 66 and 64 are in engagement. The leaf spring arm 60 is bent slightly upward when the contacts are engaging.

When the motor is initially energized, electrical power is applied through the conductors 144 and 146 and to the main winding 22 and also to the starting winding 24 through the closed contacts 64 and 66. The shaft 18 begins to rotate and thereby rotates the centrifugally operated member 56. The outer ends of the spring fingers rotate and the heads of drive screws 130 and 132 slide on a circular engaging path against the bottom surface 86 of the actuator plate 54. As the motor increases speed the resilient spring fingers 104 and 106 are deflected radially outwardly due to centrifugal forces developed on the centrifugal weights 124 and 126. Accordingly, the outer free ends 120 and 122 spread apart so as to move radially outwardly and axially rearwardly or downwardly. The actuator plate 54 moves concurrently with axial movement of the outer free ends 120 and 122 since the weight of the actuator plate 54 and reaction force due to the resilient bending of the leaf spring arm 62 maintains the bottom surface 86 in contact with the supporting surfaces 134 and 136.

When the motor reaches a predetermined speed, for example approximately 2300 r.p.m., the spring fingers are in a lower or rearward position such that the actuator plate is free to shift in a direction which permits the contacts 64 and 66 to disengage, as illustrated in FIG. 3. The leaf spring arm 62 moves downwardly and away from the leaf spring arm 60 toward an unbiased position. With the contacts 64 and 66 disengaging, the starting winding 24 is deenergized with the main winding 22 remaining energized. The shoulders 98 of the lugs 92 rest on the end frame 26 to prevent the actuator plate 54 from sliding further downwardly when the spring fingers spread further apart. The annular ridge 88 on the bottom surface 86 of the actuator plate resists the spring finger outer ends 120 and 122 from sliding off of the actuator plate 54. The stop members 110 and 112 prevent the spring fingers 104 and 106, respectively, from deflecting further downwardly or radially outwardly and thereby prevent possible interference between the rotating spring fingers and stationary portions of the motor 10.

When the electrical power is removed from motor input conductors 144 and 146, the main winding 22 of the motor 10 is deenergized and accordingly the shaft 18 slows down toward a stop position. The centrifugal forces on the weights 124 and 126 decrease and the resiliency of the spring fingers 104 and 106 causes them to return toward the upper rest position. As the outer free ends 120 and 122 move upwardly the actuator plate 54 is shifted axially upward and the guide surfaces 96 slide axially along the sides of holes 102. The projection 94 forces the contact 66 and the leaf spring arm 62 upwardly so that the contacts 64 and 66 are engaging. The engaging surfaces of the contacts 64 and 66 are rounded and the leaf spring arm 60 is slightly bent during contact engagement so that rubbing and wiping actions occur between the contacts 64 and 66. As the rotor 16 and shaft 18 comes to rest, the centrifugally operated member 56 also comes to rest so that it is operative to initiate the starting cycle of operation of the motor 10 as described hereinabove.

While the embodiment of the present invention as herein disclosed constitutes a preferred form, it is understood that other forms may be adopted in accordance with this invention.

I claim:

1. A centrifugal switch assembly for an electrical motor including a main winding, a starting winding, a shaft, a rotor fixedly mounted to said shaft, and a housing having a housing end portion rotatably supporting said shaft, said centrifugal switch assembly comprising: an electrical contact assembly mounted on said housing and including first and second contacts having mutually engaging and disengaging positions; means connecting said first and second contacts in a series circuit including said starting winding; an actuator plate including an annular portion surrounding said shaft and radially extending adjacent one side of said electrical contact assembly, said actuator plate including axially extending guide surfaces slidably engaging said housing end portion whereby said actuator plate is freely and reciprocably movable between two positions operative to move said electrical contact assembly between said engaging and disengaging positions; and a centrifugally operated member including two spring fingers mounted on said shaft and rotatable therewith, said spring fingers including free ends carrying centrifugal weights, and said free ends including supporting surfaces engaging said actuator plate, whereby said two spring fingers position said actuator plate so that said first and second contacts are maintained in a closed circuit condition when said shaft is rotated below a predetermined speed and said spring fingers are deflected radially outward by centrifugal forces when said shaft is rotated above said predetermined speed to thereby release said actuator plate for movement in an axial direction which will permit said first and second contacts to move to an open circuit position.

2. A centrifugal switch assembly for an electrical motor including a main winding, a starting winding, a shaft, a rotor having a plurality of axially extending fan blades fixedly mounted to said shaft, and a housing having a housing end portion rotatably supporting said shaft, said centrifugal switch assembly comprising: an electrical contact assembly mounted on said housing end portion and including first and second contacts having mutually engaging and disengaging positions; means connecting said first and second contacts in a series circuit including said starting winding; an annular actuator plate surrounding said shaft and extending radially between said electrical contact assembly and said fan blades, said actuator plate including a plurality of circumferentially spaced lugs extending through openings formed in said housing end portion, said lugs including axially extending guide surfaces and radially extending ends forming shoulder portions, said guide surfaces slidably engaging side portions of said openings whereby said actuator plate is axially movable relative to said shaft between two positions operative to move said electrical contact assembly between said engaging and disengaging positions, and said shoulder portions overlapping edge portions of said openings to thereby limit the inward axial movement of said actuator plate; and a centrifugally operated member including two spring fingers mounted on said shaft and rotatable therewith, said spring fingers including free ends extending between said fan blades and carrying centrifugal weights, and said free ends including supporting surfaces engaging said actuator plate whereby said first and second contacts are maintained in a closed circuit condition when said shaft is rotated below a predetermined speed and said spring fingers are deflected radially outward by centrifugal forces when said shaft is rotated above said predetermined speed to thereby release said actuator plate for axial movement which will permit said first and second contacts to move to an open circuit position.

3. A centrifugal switch assembly for an electrical motor including a main winding, a starting winding, a vertically disposed shaft, a rotor having a plurality of axially extending fan blades fixedly mounted to said shaft, and a housing having a housing end frame rotatably supporting said shaft, said centrifugal switch assembly comprising: an electrical contact assembly including first and second leaf spring arms mounted on said housing end frame having mutually overlapping free ends carrying axially aligned first and second contacts, means connecting said first ad second contacts, means connecting said first and second leaf spring arms in a series circuit including said starting winding; an actuator plate including upper and lower annular surfaces surrounding said shaft and extending radially between one of said first and second leaf spring arms and said fan blades, said upper annular surface including a plurality of circumferentially spaced lugs extending upwardly through openings formed in said housing end frame, said lugs including axially extending guide surfaces and radially extending end projections forming shoulder portions, said guide surfaces slidably engaging side portions of said openings whereby said actuator plate is freely reciprocably movable between two positions operative to move said first and second leaf spring arms between contact engaging and disengaging positions, and said shoulder portions overlapping edge portions of said openings whereby said shoulder portions and said upper annular surface alternately engage said housing end frame to limit the reciprocable movement of said actuator plate; a centrifugally operated member including two diametrically disposed flat spring fingers fixedly mounted on said shaft including free ends carrying centrifugal weights and extending radially upward between said fan blades, and said free ends including supporting surfaces engaging said lower annular surface of said actuator plate whereby said first and second leaf spring arms are urged into a contact engaging position when said shaft is rotated below a predetermined speed, and said spring fingers are deflected radially outwardly by centrifugal forces when said shaft is rotated above said predetermined speed to permit said actuator plate to move axially and release said first and second leaf spring arms to move to a contact disengaging position; and flat stop members mounted integrally with said centrifugally operated member extending radially upwardly between said fan blades and axially below said spring fingers for limiting the radially outward movement of said spring fingers.